(No Model.)
E. JUNGENFELD.
APPARATUS FOR COOLING BEER, &c.
No. 307,396. Patented Oct. 28, 1884.
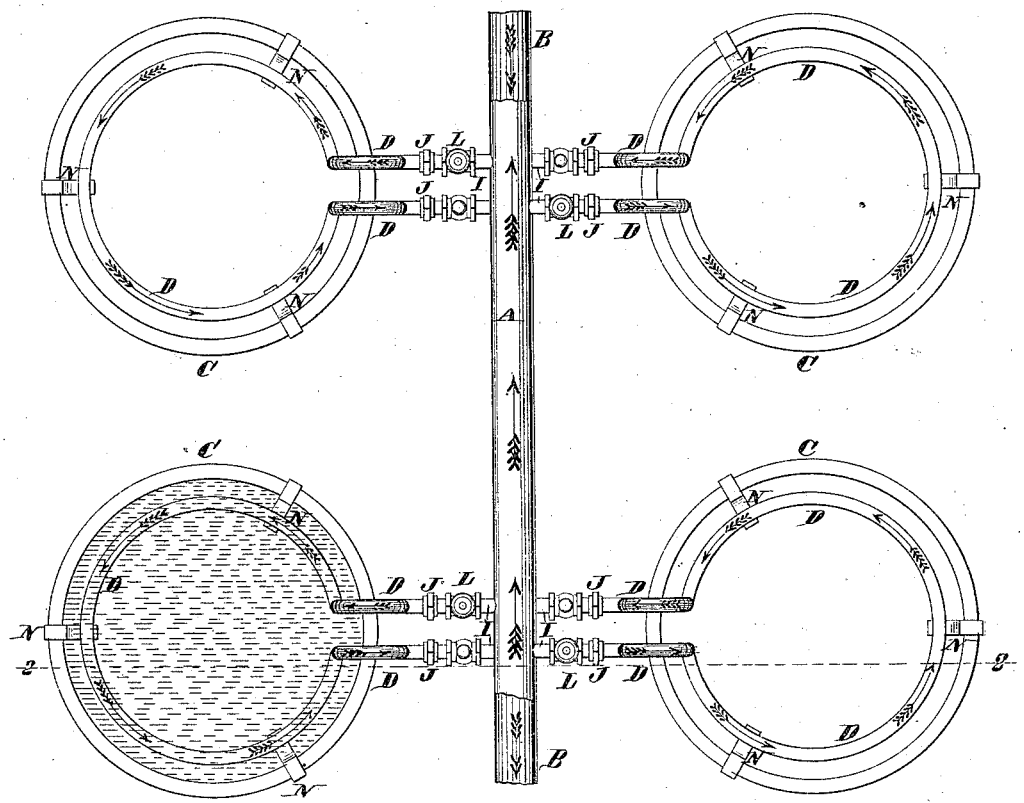
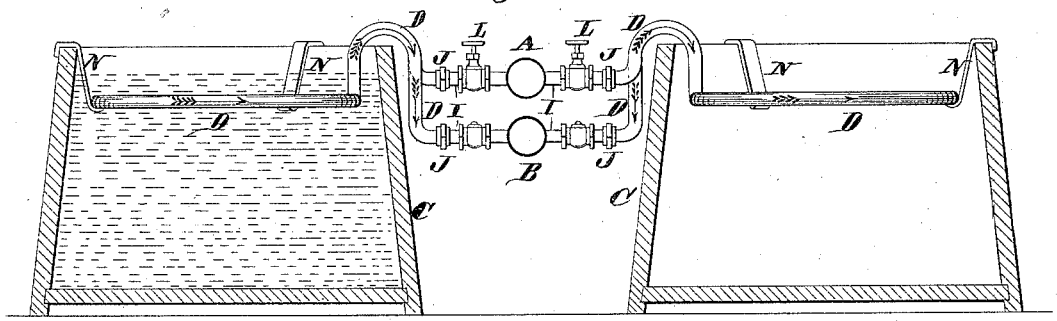
Attest:
Edward Stow
Geo. L. Wheelock.
Inventor:
Edmund Jungenfeld
By Knight Bros
Attys
N. PETERS, Photo-Lithographer, Washington, D. C.

UNITED STATES PATENT OFFICE.

EDMUND JUNGENFELD, OF ST. LOUIS, MISSOURI, ASSIGNOR TO THE EMPIRE REFRIGERATING COMPANY, OF SAME PLACE.

APPARATUS FOR COOLING BEER, &c.

SPECIFICATION forming part of Letters Patent No. 307,396, dated October 28, 1884.

Application filed June 16, 1884. (No model.)

*To all whom it may concern:*

Be it known that I, EDMUND JUNGENFELD, of the city of St. Louis, in the State of Missouri, have invented a certain new and useful Improvement in Apparatus for Cooling Beer, &c., of which the following is a full, clear, and exact description, reference being had to the accompanying drawings, forming part of this specification, and in which—

Figure 1 is a top view, and Fig. 2 a vertical section taken on line 2 2, Fig. 1.

This invention relates to an improvement on Letters Patent of the United States No. 265,123, issued to the Empire Refrigerating Company, of St. Louis, Missouri, September 26, 1882, the object being to simplify and improve the construction of the apparatus to the end that it will perform its function in a more effective manner and with a less expense.

The invention consists in features of novelty hereinafter fully described, and pointed out in the claims.

Referring to the drawings, A represents a main supply and B a main return pipe similar to those A and L of the patent above referred to.

C represents one or more vats or tubs located near the main pipes, and preferably on each side thereof, as shown.

D represents a circulating-pipe—one for each vat—one end of which is connected to the pipe A, from where it (the pipe) is carried over toward the vat, and is bent in the form of a goose-neck over the edge of the vat, is bent in the form of a ring within the vat, is bent in the form of a goose-neck again over the edge of the vat, and connects by its other end with the pipe B. The ring within the vat is, say, eighteen inches (more or less) below the upper edge of the vat, and is immersed in the beer, as shown in Fig. 2. The ends of the circulating-pipe are connected to the main pipes preferably by means of short lengths I and couplings J, and one end is provided, or may at least be provided, with a valve, L, to regulate the flow of the brine or other cooling-liquid. The couplings, as shown in Fig. 2, are below the top of the vat, as is also the valve, so that any leakage that might take place at these points cannot be conducted by the pipe into the vat, where it would spoil the beer. The course of the circulation through the pipes is indicated by arrows. The ring is supported within the vat by hangers N, having hooked ends to engage beneath the pipe and over the upper edge of the vat, as shown.

Two great practical advantages of this device over that shown and described in the patent referred to are its small cost, and the circulating-pipe, besides having a greater cooling-area, is at the top of the vat, where it does the most good, instead of at the bottom, and where it does not freeze and chill the yeast, as is the case where the pipe extends down to the bottom of the vat, as in the said patent.

When it is desired to circulate not very cold liquid through the pipe D, both ends of the pipe are connected to the return-pipe B, so that only the return-brine passes through the pipe D.

This improvement has several practical advantages over the former construction. First, the circulating-pipe being located in the upper part of the vat instead of at the bottom, the yeast is not frozen, as has been found to be the case in practice with the old form, the pipe being right down at the bottom of the vat heretofore, where the starch is; second, the cold pipe is at the top or upper part of the vat, where it is most needed; third, by having it at the top a continual circulation is kept up, the cold liquid descending and displacing the warmer, which will rise, and thus the beer is kept circulating all the time, as much so as if it were passing through pipes, and thus the temperature is kept the same throughout the vat, adding greatly to the quality of the beer; fourth, by thus keeping an even temperature and circulation the carbonic-acid gas is retained in the beer, which hastens the process of fermentation and improves the quality of the beer.

I claim as my invention—

1. The combination of the main pipes, vat, and circulating-pipe, the latter located in the upper part of the vat, and receiving cooling-liquid from one of the main pipes, discharging it into the return-pipe, and being bent in a coil within the vat, substantially as and for the purpose set forth.

2. The combination of the main feed and return pipe, vat, and circulating-pipe, the latter located in the upper part of the vat and connected by one end to the feed-pipe, and bent in the form of a goose-neck over the top of the vat, then bent in the form of a ring or coil within the vat, then bent in the form of a goose-neck again over the top of the vat, and connected by its other end to the return-pipe, the ring or coil being supported within the vat by hangers, substantially as shown and described, for the purpose set forth.

EDMUND JUNGENFELD.

In presence of—
 GEO. H. KNIGHT,
 SAML. KNIGHT.